United States Patent
Pattyn

Patent Number: 6,109,799
Date of Patent: *Aug. 29, 2000

[54] METHOD OF ACTIVATING INDIVIDUALLY ENERGIZABLE ELEMENTS IN A THERMAL RECORDING HEAD

[75] Inventor: Luc Pattyn, Berchem, Belgium

[73] Assignee: Agfa-Gevaert, Mortsel, Belgium

[*] Notice: This patent is subject to a terminal disclaimer.

[21] Appl. No.: 09/111,757

[22] Filed: Jul. 8, 1998

Related U.S. Application Data

[62] Division of application No. 08/773,186, Dec. 27, 1996, Pat. No. 5,833,370.
[60] Provisional application No. 60/015,157, Apr. 10, 1996.

[30] Foreign Application Priority Data

Jan. 25, 1996 [EP] European Pat. Off. ............... 96200167

[51] Int. Cl.⁷ .................................................. B41J 2/315
[52] U.S. Cl. .......................... 400/120.01; 400/120.07; 400/120.09
[58] Field of Search ................. 400/120.09, 120.07, 400/120.01; 347/183, 188, 190

[56] References Cited

U.S. PATENT DOCUMENTS

| | | |
|---|---|---|
| 4,335,968 | 6/1982 | Regnault . |
| 4,994,822 | 2/1991 | Caine . |
| 5,153,605 | 10/1992 | Ohara et al. ................. 346/76 |
| 5,255,011 | 10/1993 | Minowa et al. ............. 346/76 |
| 5,327,165 | 7/1994 | Elliott ........................ 346/76 |
| 5,669,720 | 9/1997 | Negishi et al. ............. 400/120.05 |
| 5,784,092 | 7/1998 | Fukuoka .................... 347/190 |
| 5,795,081 | 8/1998 | Miyaji ....................... 400/120.07 |
| 5,833,376 | 11/1998 | Pattyn ...................... 400/120.07 |
| 5,934,811 | 8/1999 | Muyaji ...................... 400/120.07 |

FOREIGN PATENT DOCUMENTS

| | | |
|---|---|---|
| 0 080 075 | 6/1983 | European Pat. Off. . |
| 2 196 498 | 4/1988 | United Kingdom . |
| 2 271 037 | 3/1994 | United Kingdom . |

*Primary Examiner*—Ren Yan
*Assistant Examiner*—Charles H. Nolan, Jr.
*Attorney, Agent, or Firm*—Baker Botts L.L.P.

[57] ABSTRACT

A method of activating a binary controllable element of a thermal head in correspondence with an N-bit data value representing a density value D by converting a digital signal representative of said N-bit value into a binary signal that, when applied to said transducer under control of a strobe signal, causes said physical value D to be generated.

The binary signal is composed so that it is active during a period $t_{on}$, wherein $t_{on}$ on is equal to the sum of a number of time steps being selected from at least two different predefined time steps.

11 Claims, 5 Drawing Sheets

METHOD OF ACTIVATING INDIVIDUALLY ENERGIZABLE ELEMENTS IN A THERMAL RECORDING HEAD

This is a divisional of application Ser. No. 08/773,186 filed Dec. 27, 1996 now U.S. Pat. No. 5,833,376.

This application claims the benefit of U.S. Provisional Application Ser. No. 60/015,157, filed Apr. 10, 1996.

FIELD OF THE INVENTION

The present invention is in the field of thermal imaging and relates to the activation of individual energisable elements of a thermal recording head.

BACKGROUND OF THE INVENTION

Thermal imaging or thermography is a recording process wherein images are generated by the use of image-wise modulated thermal energy.

Two different methods are known. In accordance with a first method, referred to as direct thermal imaging, a visible image pattern is obtained by direct image-wise heating of a recording material containing matter that by a chemical or physical process changes colour or optical density. A particularly interesting direct thermal imaging element comprises an organic silver salt in combination with a reducing agent. When heated, the silver ions are developed to metallic silver.

In accordance with a second method, referred to as thermal dye transfer printing, a visible image pattern is formed by transfer of a coloured species from an image-wise heated donor element onto a receptor element. Thermal dye transfer printing is a recording method wherein a donor element is used that is provided with a dye layer. Portions of the dye are transferred onto a contacting receiver element by the application of heat in a pattern normally controlled by electronic information signals.

Image-wise heating can in either of the above systems be obtained by means of a thermal recording head comprising a plurality of juxtaposed resistors. Most commonly line-wise recording heads are used. The recording head comprises one resistor per pixel in a line. The head writes one line at the time. A two-dimensional image is then built from a large number of one-dimensional scan-lines.

In either of these techniques, the heating is controlled by an electric signal. The electric signal represents the density value of each pixel of an image by means of an N-bit digital signal value. The signal value of a pixel is transferred through a driver circuit to a thermal recording head.

The elements of a thermal recording head commonly are binary controllable devices, i.e. they offer only on/off control. So, when an N-bit signal value is to be transferred to an element of a recording head, a time-multiplexing scheme is required to translate the N-bit pixel value into consecutive 1-bit values that can be consecutively fed to an element of the thermal head to activate its operation during successive time steps. Such a process is commonly called 'slicing'. In every time step or time slice, new pixel information is generated and transmitted to the thermal head. Then, an enable signal (called strobe signal) is generated to turn a selected pixel momentarily on.

The prior art slicing procedure is summarized in the following with regard to the process of imaging a density D represented by an N-bit value 'A':

1) An N-bit value 'A' is converted into a sequence of M 1-bit values $a_1, a_2, \ldots a_M$; wherein M is less than or equal to $2^N$ and the conversion is such that the sum of all 1-bit values $a_1, a_2 \ldots a_M$ is exactly equal to A.

2) All 1-bit values $a_1, a_2, \ldots a_M$ are generated in sequence, each for the same duration of time t, the sequence of 1-bit values constitutes a signal, that is active during a period of time $t_{on}$ that is equal to t multiplied by A, since the sum of $a_1, a_2, \ldots a_M$ equals A.

The constant time period t in the slicing process determines the smallest achievable non-zero $t_{on}$ time. This period is called the time step of the slicing process.

Small time step values allow very short and precise $t_{on}$ times.

However, the use of a very small time step also has disadvantages:

1) Small time steps are more difficult to generate very accurately than larger time steps.

2) The ratio of the largest acceptable $t_{on}$ time (further called $t_{on,max}$) and the smallest non-zero $t_{on}$ time (called $t_{on, min}$), determines the number of bits N needed to represent a value, for example the digital N-bit representation of a density D. So, in order to be able to reduce $t_{on}$ time, a larger number of bits is required. Normally $t = t_{on, min}$, and N is such that $2^{(N-1)} <= t_{on,max} < 2^N$.

So, reducing $t_{on,min}$ for example by a factor of two, while keeping $t_{on, max}$ constant will cause an increase of N by 1.

3) Smaller time steps not only result in larger values of N, but also in an increase of information to be transferred to the thermal head when producing an image.

Let us assume a typical case wherein a pixel value is represented by a 10-bit digital value and wherein pixel values are fed to a line-wise thermal head comprising about 4350 individual addressable elements. Let us further assume that one shift register is used for each group of 128 individual elements out of these 4350 elements. (Further details on the use of such shift registers will be explained further on with reference to the drawings).

Conversion of the 10-bit digital value for each pixel into consecutive 1-bit values causes a hundred fold increase of the data to be generated and transferred to the thermal head. Indeed, slicing causes a 10 bit value to be converted into $2^{10} = 1024$ one-bit values that are generated in each of the slices whereas without this conversion 10 bits were required only once per scan line.

So, slicing is a procedure that involves huge amounts of data, requiring very high clock frequencies or massive parallel hardware.

For example, in the case in which 20 msec per scan line is provided, each of the above-mentioned slices has less than 20 microseconds available to generate and transmit 1 bit to every element of the thermal head.

Assuming that there are about 4350 individual elements in the thermal head, this amounts to a bit generation requirement of around 220 Mbit/sec.

In the described example a thermal head comprises a shift register per 128 individual elements, so 34 shift registers are used. Then, each shift register should be clocked at 6.4 MHz. This frequency comes very near to the maximum performance specification of these shift register chips.

In thermal printing technology currently under development, one even wishes to reduce the line printing time, e.g. to 10 msec per scanline instead of 20 msec per scanline. Then, frequencies double (or the degree of parallelism doubles) and the shift frequencies inside the head clearly exceed the head's capabilities.

In U.S. Pat. No. 4,335,968 a thermal printing method has been disclosed wherein a colour tint is reproduced by delivering the bits of a digital value representing a tint in descending order during different periods of time. For example bits of weight 0, 1, 2, 3 are delivered by registers $M_i$ during respective times $t_1$, $t_2-t_1$, $t_3-t_2$, $t_4-t_3$. A power supply delivering power to a number of resistors, delivers a feed voltage when the corresponding input is in a logical state '1'. In this method the period of time during which power is applied to a resistor element is determined by the weight (bit position) of the significant bits in a digital representation of a tint to be printed.

In GB 2 196 498 a pulse width modulation control circuit has been described for thermal printers. A digital representation of a density value is split into an upper bit and a lower bit portion. The upper bit portion is converted into a main pulse width modulated signal based on a first time duration. The rest of the bits are converted into a sub pulse-width modulated signal based on a second unit time duration. Head driving signals are generated on the basis of the main and sub pulse width modulated signals.

OBJECTS OF THE PRESENT INVENTION

It is an object of the present invention to provide a method and a system for activating binary controllable transducers, more specific for activating elements of a thermal recording head.

It is a further object to provide a thermal recording head for application in fast operating thermal printers wherein the line printing time is short.

STATEMENT OF THE INVENTION

To achieve the above objects the present invention provides a method of activating a binary controllable transducer in correspondence with an N-bit data value A representing a physical value D by converting a digital signal representative of said N-bit value into a binary signal that, when applied to said transducer under control of a strobe signal, causes said physical value D to be generated, comprising the steps of (i) converting said N-bit value A into a linear combination $$\sum_{i=1}^{P} X_i A_i$$

of P values $A_i$, P being greater than or equal to 2 and being smaller than N, wherein with each of said values $A_i$ a predefined time step $t_i$ corresponds, and (ii) converting said digital signal into a binary signal that is active during a period $t_{on}$, wherein $t_{on}$ is equal to $$\sum_{i=1}^{P} X_i t_i.$$

The term 'time step' refers to a non-zero time period during which a binary signal is active.

By the term 'transducer' is meant a device that, when actuated by power from one system, is able to supply power in the same or another form to a second system.

Examples of transducers that are envisaged in the context of the present application are transducers that convert electric energy into heat such as the resistors in a thermal recording head or transducers that convert electric energy into light such as light emitting diode elements for example in a LED display device. Still other examples are possible.

A physical value that is generated in the context of the present application is for example a visual density or intensity etc.

The method of the present invention is advantageous in that the total amount of information that is to be transferred to the transducer is significantly lower than in the case where the prior art slicing process were applied to the original N-bit signal value.

In the following we assume that a binary signal is said to be active when it provides a positive contribution to the activation of a transducer element.

In one embodiment the binary signal is active during a single continuous period equal to $t_{on}$.

In an alternative embodiment, the binary signal is active during more than one separated time period, the duration of each individual time period being a multiple of one said predefined time step or the sum of a number of time steps selected from the predefined time steps.

In a preferred embodiment the number of predefined time steps that can be selected to compose $t_{on}$ is two. This embodiment is preferred because with only two different time steps $t_1$ and $t_2$, the above objects of the present invention can already be achieved, while the implementation remains as simple as possible.

According to the slicing method an N-bit value 'X' would be converted into a sequence of 1-bit values constituting a signal that is active during a period $t_{on}$ that is equal to t multiplied by 'X'.

Selecting a number of different time steps equal to two ($t_1$ and $t_2$), and replacing an input energy value X*t, corresponding to an N-bit value 'X' wherein t represents the time step required if the prior art slicing method were applied, by the expression $X_1*t_1+X_2*t_2$ introduces three degrees of freedom, and allows us to impose three restrictions. The following restrictions are preferred in the context of this invention:

$t_1 = K * t$
$t_2 = (K+1) * t$
$0 <= X_2 <= K-1$ where K is a small integer constant.

Mathematically, the replacement of X*t by the expression $X_1*t_1+X_2*t_2$ is always possible under these restrictions. However, the fact that $X_1$ should always be positive implies that the replacement of X*t by $X_1*t_1+X_2*t_2$ is not achievable for some small X values. Indeed, all values X>=K* (K−1) can be reproduced exactly, as well as some values below that limit. The remaining values however will have to be approximated, e.g. by using a look up table.

The following considerations are taken into account when determining a preferred value of the factor K.

By the method of this invention, the amount of information required by the thermal head is almost reduced by the same factor K so it would seem useful to select a large value of K.

However, large K values imply the following two disadvantages:

the lower limit K*(K−1) mentioned above, increases quadratically with K, reducing the usable range of the N bit data values X. The range of values that can be exactly represented is reduced from (0, $2^N-1$) to (K* (K−1), $2^N-1$).

the total time needed to generate all 1-bit data values increases with increasing K-values. The total time to be allotted for a worst-case data value X has an upper boundary of $T_{max} = X_{1,max}*t_1 + X_{2,max}*t_2$ So that $T_{max} = (X_{max}/K) * (K*t) + (K-1) * ((K+1)*t)$ which can be approximated by $(X_{max}+K^2)*t$. In the prior art standard slicing method $T_{max}$ equals $X_{max} * t$; In order not to increase $T_{max}$ too much, it is important to keep $K^2$ much smaller than $X_{max}$. So, both reasons explained above result in the requirement of keeping $K^2$ much smaller than $X_{max}$.

For a system with a 10 bit data value and an $X_{max}$ of 1023, K should not be larger than 8 (thereby reducing the exactly representable data range by not more than 6% and increasing the line time by the same 6%).

However, it is preferred to use K=4 (reducing the exactly representable data range by not more than 1,5% and increasing the line time by the same 1,5%).

As mentioned above, digital N-bit values that cannot be obtained by the selected number of predetermined time steps of different duration can be obtained by approximation, e.g. by using a look up table.

The present invention has been developed for application in the field of thermal printing, more specifically for activating the elements of a (line-wise) thermal recording head that is used in direct thermal imaging.

A particularly interesting direct thermal printing material comprises an organic silver salt in combination with a reducing agent. Under influence of heat applied to this material, silver ions are reduced to metallic silver.

As has been explained before, it will be clear to one skilled in the art that the invention is not limited to this field of application and that it can be applied to other fields where binary activatable transducers need to be activated in correspondence with an N-bit digital value. An example of such a field (as has been described above), is image display, for example an LED display.

Another aspect of this invention relates to a recording system for recording onto a recording material density values, each being represented by an N-bit data value comprising:

a number of individually energisable recording elements,
   converting means for converting a digital signal representative of said N-bit data value representing a density value D into abinary signal that is active during a time period $t_{on}$,
   means for applying said binary signal to a recording element to activate its operation, characterised in that said converting means convert said digital signal into a binary signal that is active during a time period $t_{on}$ that is equal to the sum of a number of time steps being selected from at least two different predefined time steps.

Preferably the number of predefined time steps is two.

Preferably the ratio of the duration of the first time step to the duration of the second time step is K/K+1.

Preferably $0<=X_2<=(K-1)$.

In one embodiment that is preferred for the same reasons as set out above with regard to the method of the present invention, K equals 4.

In a particular embodiment means are provided to store an approximation value or a replacement value for those digital N-bit values that cannot be obtained by the selected number of predetermined time steps of different duration.

BRIEF DESCRIPTION OF THE DRAWINGS

The present invention will be described with reference to the following accompanying drawings in which.

DETAILED DESCRIPTION OF THE DRAWINGS

Figure 1:
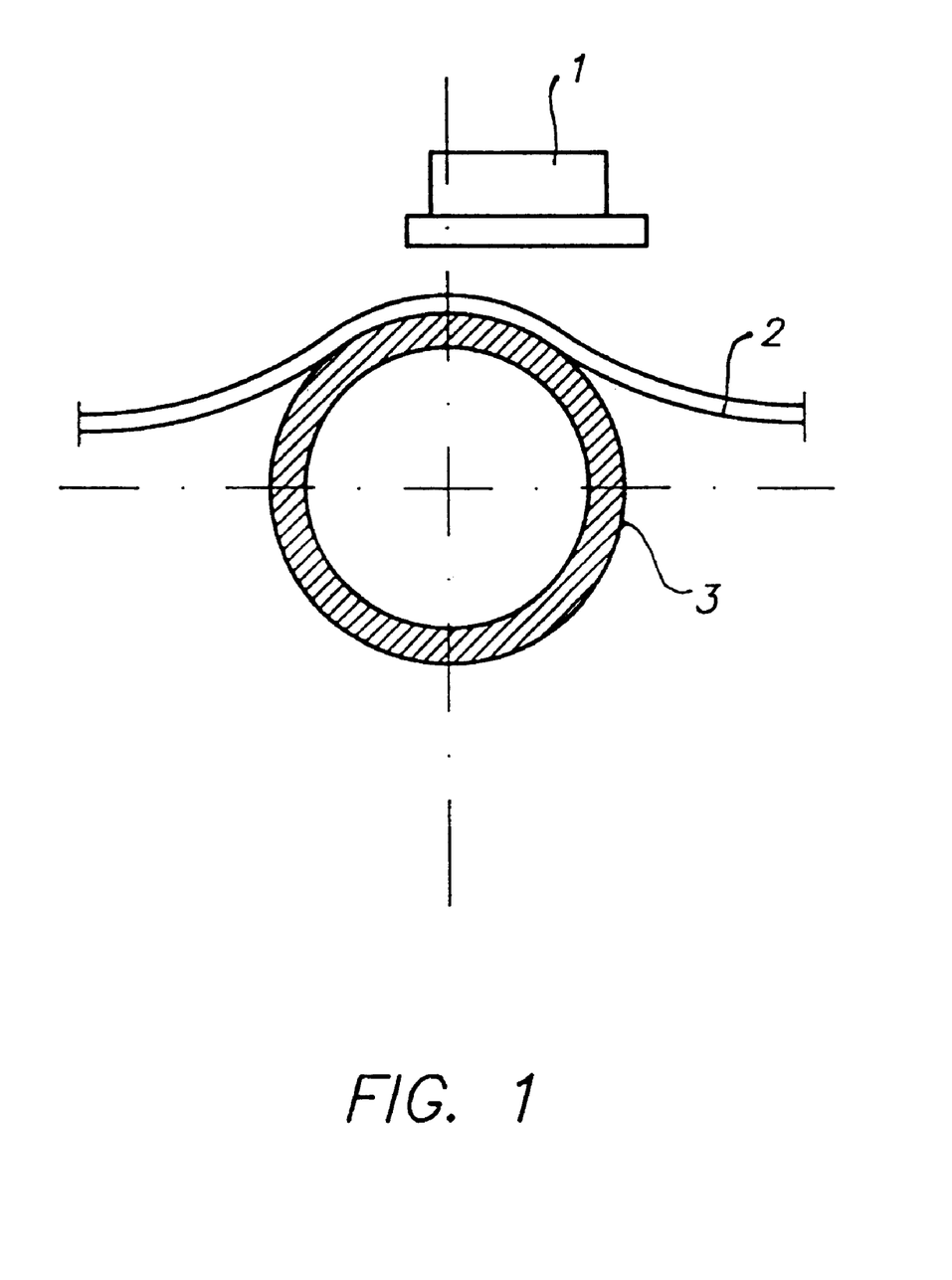
FIG. 1 is a schematic cross-sectional view of a direct thermal printer.

FIG. 1 shows the components of a thermal printer that are relevant in the context of the present invention.

The printer comprises a line-wise recording head 1 consisting of a number of juxtaposed resistor elements and associated electronic driver circuitry.

A recording material 2, which may be in web or sheet form is secured to a rotatable drum 3 that is driven by a driving means (not shown) so that the recording material is advanced past the recording head 1.

The recording material in this example comprises a support coated with a thermo-sensitive layer containing an organic silver salt. When being heated by the elements of the recording head the organic silver salt is locally reduced to metallic silver thereby producing a density that is proportional to the amount of energy transferred to the recording material at a specific location.

Energy is applied to each of the resistors under control of an electrical signal. The amount of energy that is applied to an element of the recording head is controlled in accordance with the density to be reproduced by this element.

Figure 2:
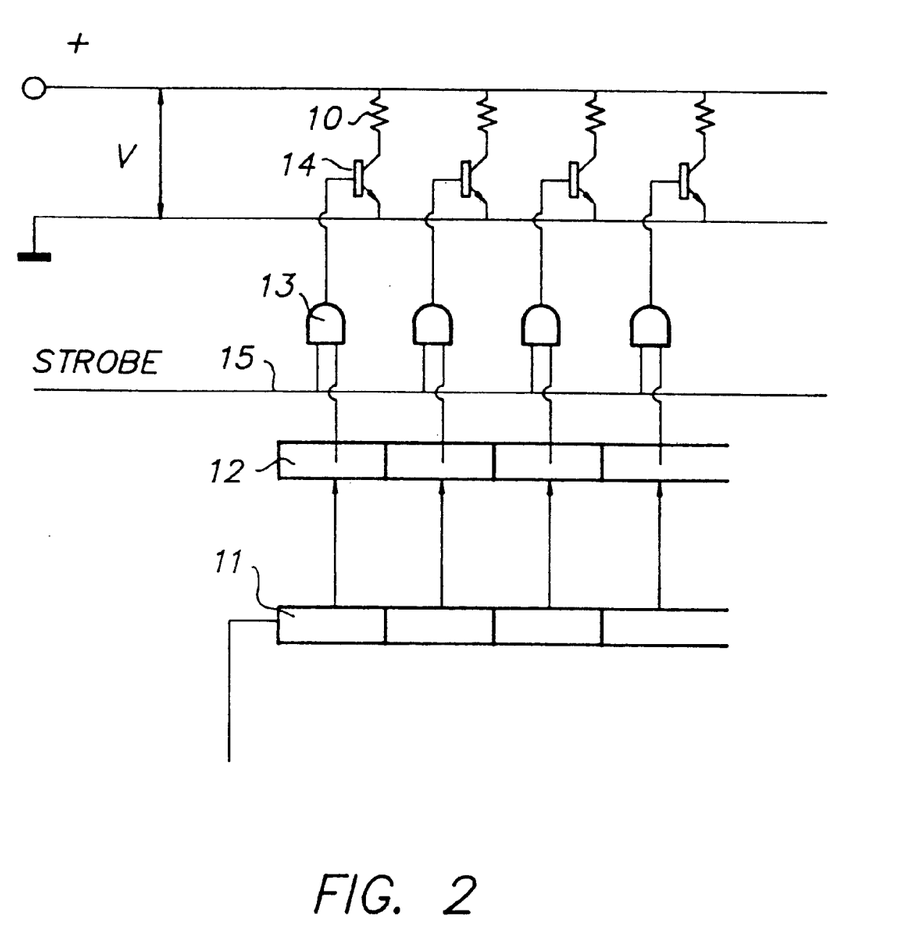
FIG. 2 is a scheme illustrating the data flow in the thermal head.

An electronic scheme illustrating the composition of the recording head is shown in FIG. 2. The recording head of this thermal printer comprises 4352 individually energisable resistors (10).

This number of resistors is subdivided into 34 groups of 128 individual resistors. The head comprises 34 shift registers (11) each providing data signal values for a group of 128 resistor elements.

The output of each of the registers is applied to a latch register (12).

The output of each element of the latch registers is connected to a corresponding gating means (13).

The output terminal of the gating means is connected to the electronic driver (14) of a resistor element of the recording head so that, under control of a strobe signal (15), the output of an element of the latch register can be gated to an individual element of the thermal recording head.

According to the invention, an N-bit digital signal value (in the present embodiment N=10) is converted into a binary signal value before being applied to the resistor elements.

Figure 3:
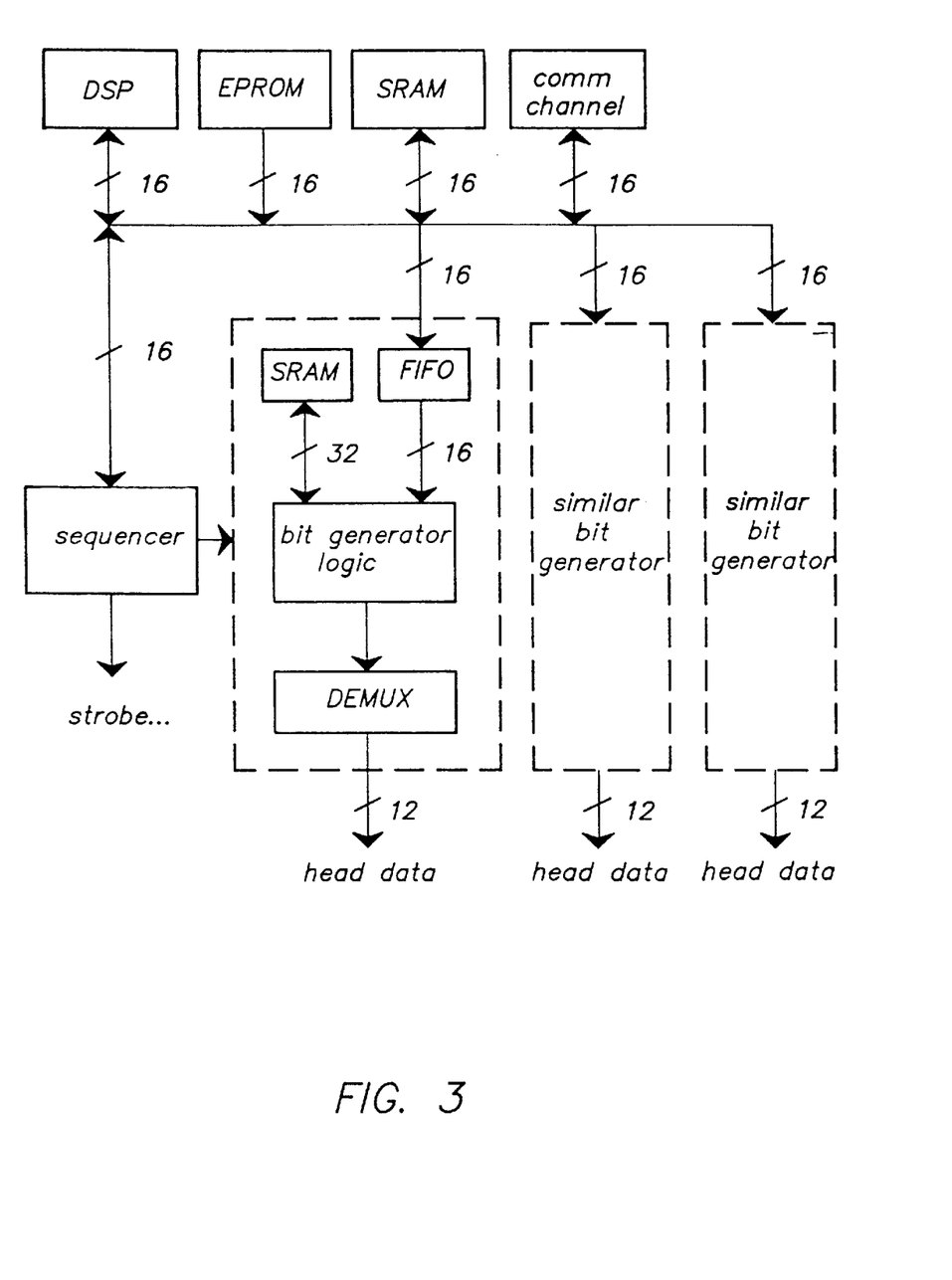
FIG. 3 is a scheme of an electronic system for generating a binary signal in accordance with the present invention.

This conversion is performed by means of a thermal head controller board illustrated in FIG. 3.

This controller board comprises a computer subsystem and a bit generation subsystem.

The computer subsystem consists of a micro-processor DSP (TMS320C50 of Texas Instruments), a 64 Kword EPROM memory bank (containing code) and 32 Kword SRAM bank and communication facilities.

The bit generation subsystem comprises a number of bit generators and a sequencer. In this specific embodiment three bit generators are used that generate real time video signals to be applied to the 34 shift registers on the thermal head.

Each bit generator comprises a first SRAM bank used as a FIFO, this SRAM bank contains the data for the next scan line, a second SRAM bank containing the parameters of the current scan line and some logic.

The sequencer produces control signals for the thermal head, such as the strobe, addresses all SRAM chips of the bit generators and produces control lines for the bit generator logic.

A demultiplexer is provided for each bit generator. The demultiplexer transforms the high-speed serial pixel stream into a set of 12 parallel data lines at lower frequency.

The operation of the device is basically as follows.

The computer subsystem reads data from a scan line out of the communication channel and processes them. This processing comprises the following actions:

(1) spatial re-ordering: the order of the pixel data applied to the computer sub-system is re-arranged so as to be adapted to the structure of the bit generators and the shift registers in the thermal head. This spatial re-ordering is not particularly relevant with regard to the present invention and will not be explained in further detail.

(2) Replacement of a 10 bit input value X (representing a density to be reproduced) into two new values: a 2 bit-value $X_2$ representing the number of special superslices and an 8 bit value $X_1$ representing the number $X_1$ of normal superslices according to the following relation:

$$X = 5 * X_2 + 4 * X_1$$

and taking into account the following constraints:

$$0 <= x_2 <= 3,$$

$$0 <= X_2.$$

so that : $X_2 = X \% 4$ (% represents integer remainder)

$$X_1 = (X/4) - X_2$$

(/ indicates integer quotient)

These values are applied to one of the bit generators that will generate the required bits and feed them through the demultiplexer to one of the shift registers (11).

Figure 4:
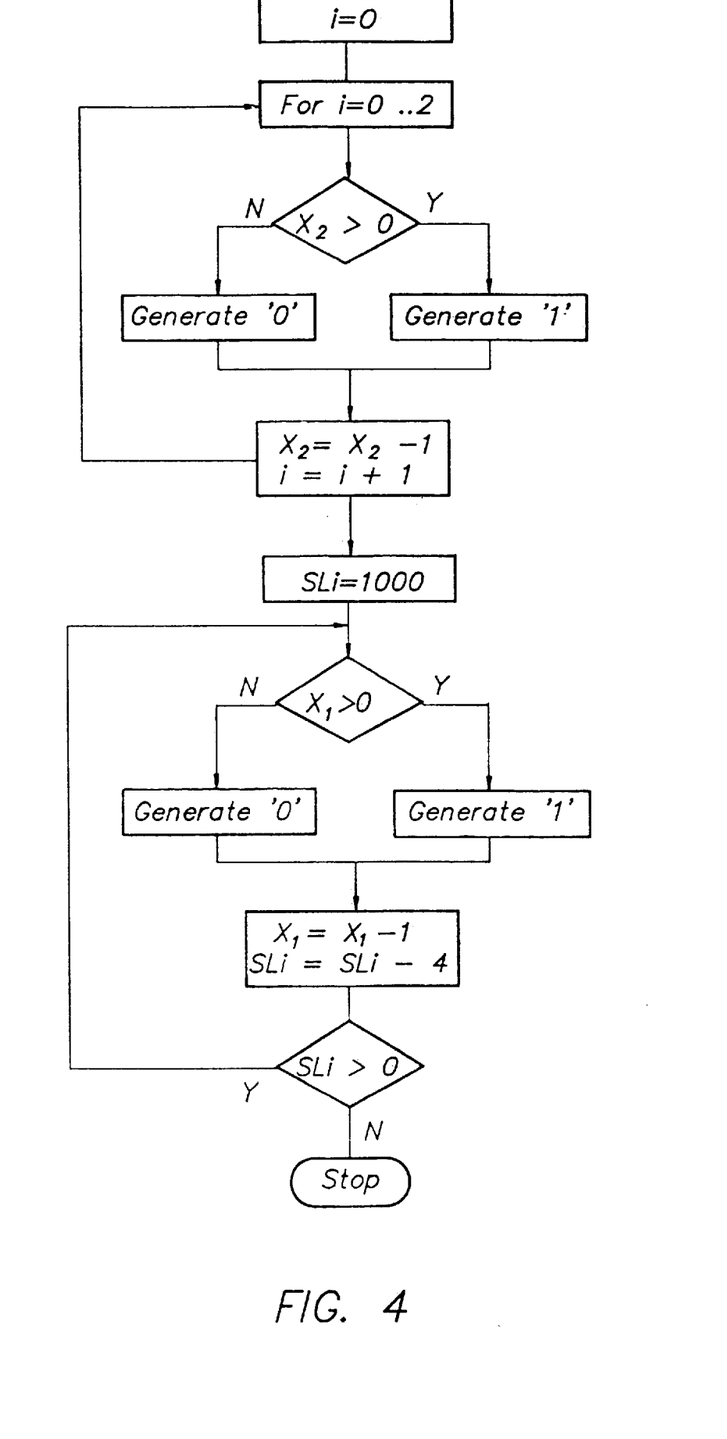
FIG. 4 illustrates the operation of the bit generators.

The operation of the bit generators, illustrated in FIG. 4, is as follows.

For each pixel, the values $X_2$ and $X_1$ generated by the computer subsystem are applied to one of the bit generators. If the number of special superslices $X_2$ is strictly positive, a logic '1' is generated, otherwise a '0' is generated. Next $X_2$ is decreased by one and another 2 times subjected to the same kind of loop.

Then the number of slices is initialized (in this example SLICE is set to be 1000). Then, on condition that $X_1$ is strictly positive a logic 'one' is generated, otherwise a logic 'zero' is generated.

The output of the bit generators is applied to the shift registers (11) and applied through latches (12) to gating means (13). Gating means (13) gate the output signals of the latches under control of a strobe signal (15) to the drivers of the elements of the thermal head.

The generation of the strobe pulses is controlled by the sequencer. During the generation of the superslices, 5 strobe pulses are generated whereas during the generation of the normal slices 4 strobe pulses are generated.

Figure 5:
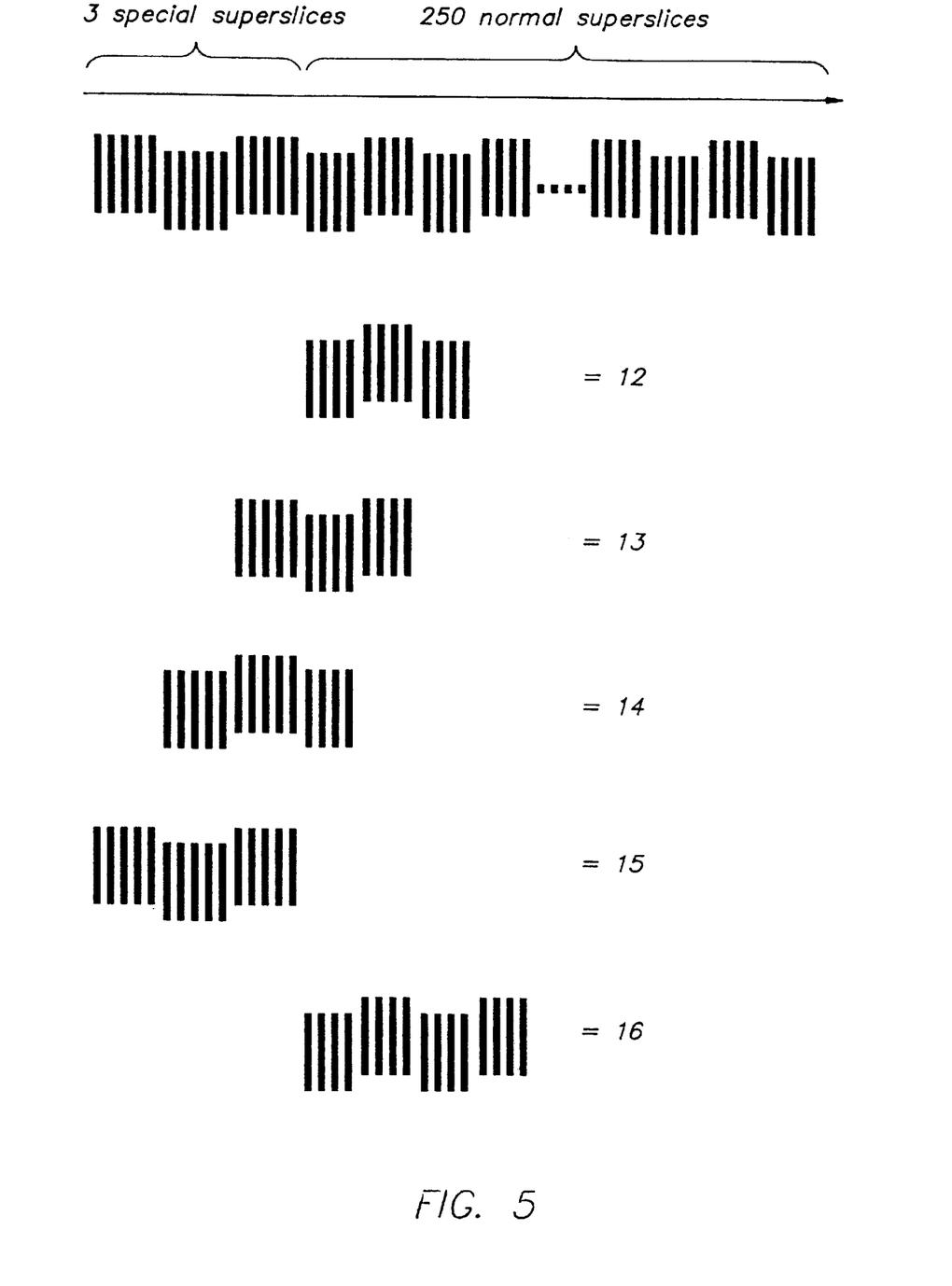
FIG. 5 illustrates the method of the present invention for a number of digital N-bit values.

FIG. 5 illustrates the result of converting an N-bit value into a binary signal by application of the method of the present invention for the following N-bit values: 12, 13, 14, 15, 16.

In the illustrated embodiment an arbitrary N-bit value is converted into a number of normal superslices and a number of special superslices. The number of special superslices is limited to three. The ratio of the time step of normal superslices to the time step of special superslices is equal to ⅘.

The figure also illustrates that the time step of the superslices (normal and special) is an integer multiple of the time step used in a conventional slicing process.

It will be clear to one skilled in the art that in this particular example wherein only two different time steps are selected and the ratio of $t_1$ to $t_2$ is equal to ⅘, that a number of digital values cannot be reproduced as such.

For example values smaller than 4 cannot be reproduced, also e.g. the values 7 and 11 cannot be reproduced.

In this particular field of application wherein the values are used to control the activation of resistors in a thermal head, this fact is irrelevant. Indeed, since a threshold value must be crossed in order to initiate the thermal printing process, these low digital values are not used.

However, applications might be thought of wherein these low values are indeed important. In such applications, the apparatus may be provided with a look up table stored in an electronic memory, said look up table comprising for each value that cannot be reproduced a replacement value that can be formed by application of the conversion according to the present invention.

What is claimed is:

1. A method of activating a binary controllable transducer in correspondence with an N-bit data value A representing a physical value D by converting a digital signal representative of said N-bit value into a binary signal that, when applied to said transducer under control of a strobe signal, causes said physical value D to be generated, the method comprising the steps of:

(i) converting said N-bit data value A from said physical value D into a linear combination $$\sum_{i=1}^{P} X_i A_i$$

of P values $A_i$, P being greater than or equal to 2 and being smaller than N, wherein a predefined time step $t_i$ corresponds to each of said values $A_i$, and (ii) converting said digital signal into said binary signal that is active during a period $t_{on}$, wherein $t_{on}$ is equal to $$\sum_{i=1}^{P} X_i t_i.$$

2. A method according to claim 1 wherein said binary controllable transducer is an element of a thermal recording head and said physical value D is a density to be reproduced on a recording material.

3. A method according to claim 1 wherein there are two time steps.

4. A method according to claim 3 wherein the ratio of said time steps is K/(K+1).

5. A method according to claim 4 wherein $0 <= X_2 <= (K-1)$.

6. A method according to claim 1 wherein an N-bit value that cannot be obtained by converting a digital signal representing said value into said binary signal using a selected number of predetermined time steps, is replaced by an approximation value that can be obtained by the predetermined time steps.

7. A recording system for recording onto arecording material density values, each density value being represented by an N-bit data value A, the system comprising:

a number of individually energisable recording elements;

converting means for converting a digital signal representative of said N-bit data value representing a density value D into a binary signal that is active during a time period $t_{on}$; and means for applying said binary signal to a recording element to activate its operation, wherein:

said converting means converts said N-bit data value A from said density value D into a linear combination $$\sum_{i=1}^{P} X_i A_i$$

of P values $A_i$, P being greater than or equal to 2 and being smaller than N, wherein a predefined time step $t_i$ corresponds to each of said values $A_i$, and said time period $t_{on}$ is equal to $$\sum_{i=1}^{P} X_i t_i.$$

8. A recording system according to claim 7 wherein there are two time steps.

9. A recording system according to claim 8 wherein the ratio of said time steps is K/(K+1).

10. A recording system according to claim 9 wherein $0<=X_2<=(K-1)$.

11. A recording system according to claim 7 wherein means are provided for storing a look up table wherein replacement values are stored for N-bit digital values that cannot be obtained by the conversion using the selected time steps.

* * * * *